United States Patent Office 2,884,380

Patented Apr. 28, 1959

2,884,380

THERMAL INSULATION MATERIAL AND METHOD OF MAKING THE SAME

Henry Albert Cook, Norristown, Robert E. Fleming, Plymouth Meeting, and Russell H. Heilman, Glenshaw, Pa., assignors to The Philip Carey Manufacturing Company, Lockland, Cincinnati, Ohio, a corporation of Ohio No Drawing. Application August 23, 1956
Serial No. 605,712

23 Claims. (Cl. 252—62)

This invention relates to thermal insulation material and to the method of making the same. More particularly, it relates to preformed industrial insulation material for use in insulating pipes, stills, chemical reaction boilers, vessels and the like, wherein the insulation material is molded into blocks or pipe covering sections which are shaped to fit the particular surface to be insulated.

There are various insulation materials now on the market, some of which are efficient within certain temperature ranges but generally speaking a material which is designed for use at high temperatures, say 1700° F., is not thermally efficient for low temperature use and, vice versa, the so-called low temperature insulation materials fail due to inadequate heat resistance at higher temperatures. Therefore, the various insulation manufacturers provide a choice of insulation materials and selection of a particular material is made on the basis of the temperature which the material will have to withstand.

Insulating coverings, such as for example hemi-cylindrical shapes designed for use in the insulation of pipes, have been made by various procedures including filter molding. Because of the shrinkage characteristics of these insulation materials when dried, it has generally been necessary to use over-size molds and then machine the molded pieces to the required final dimensions.

With the above considerations in mind, it is an object of the present invention to provide an insulation material which may be molded to any desired configuration and which will have the characteristic of being dimensionally stable so that the pieces may be molded to their required size and used without further machining.

It is another object of our invention to provide an insulation material which will be substantially universal in respect to the temperature range for which it is serviceable, so that it may be used at temperatures from −350° F. up to 1700° F. It is another object of the invention to provide an insulation material which over the above noted temperature range will be mechanically and dimensionally stable, will exhibit good strength and will have a high thermal insulation efficiency throughout the range.

It is still another object of the invention to provide an insulation material as above outlined which will be highly resistant to structural deterioration by moisture or boiling water.

These and various other objects of the invention which we shall point out in more detail hereinafter we accomplish by that composition of matter and by that method of which we shall now disclose certain exemplary embodiments.

In the practice of our invention we provide an insulation material composed largely of expanded cellular perlite and comprising a primary binder of montmorillonitic clay together with a secondary binder of organic material and fiber. The secondary binder material mentioned above will either be an organic binder material which is resistant to boiling water or, if it is an organic binder which is not resistant to boiling water, we add a small amount of silicone to afford a high degree of water repellency to the molded product. The silicone does not itself function as a binder, but in effect modifies the non-water-resistant binder to render it water resistant.

The expanded perlite is preferably of low bulk density with a minimum proportion of shatter material and a maximum amount of floats. The expanded perlite matereial which we have found particularly suitable is produced from raw perlite ore mined near Caselton, Nev. Other sources of suitable perlite ore are deposits at Florence, Colo.; Sicorra, N. Mex.; North Agua, N. Mex.; Grants, N. Mex.; and Lovelock, Nev. This perlite ore is first ground to a nominal 100 mesh size and then is expanded by heating to between 1600° and 2000° F. in a perlite expanding furnace. The resulting product, i.e. the expanded cellular perlite, preferably has a bulk density of between 2 and 5 pounds per cubic foot. The expanded perlite should preferably be what is known as "tough" product, i.e. a non-fragile product. It will be understood that if low density in the finished product is not a primary consideration, an expanded cellular perlite having a bulk density up to about 10 pounds per cubic foot is permissible.

A typical expanded cellular perlite produced from Caselton, Nev., ore over a period of two years presented the following characteristics, which we have found particularly suitable for making our new product. The loose fill density in pounds per cubic foot ranged between 3.80 and 4.55. As far as particle size is concerned, the residue on a 20 mesh screen ranged from a trace as a minimum to 1.2% as a maximum. Of the material passing a 20 mesh screen the amount retained on a 30 mesh screen ranged from 0.3% to 3.3% of the total sample. Of the material passing through the 30 mesh screen, the percentage retained on a 50 mesh screen ranged from a minimum of 10.0% to 21.2% of the total sample. Of the material passing through the 50 mesh screen, the percentage retained on a 100 mesh screen ranged from a minimum of 22.4% to a maximum of 38.2% and the amount passing through 100 mesh screen ranged from a minimum of 38.8% to 63.0% of the total sample.

It will of course be understood that where low density is not a primary requirement, the perlite may be replaced in part by other heat resistant mineral insulators such as vermiculite, diatomite, calcium silicate, calcium carbonate, etc. Where low density is a requirement, however, an expanded cellular perlite as above outlined should be used.

As a primary binder, we use a montmorillonitic clay, a typical commercial variety of which is known as bentonites. The bentonite is preferably a high swelling bentonite and we use from about 5% to 20% of this material by weight of the dry solids in the final product. Less than 5% of bentonite makes the final product too weak while more than 20% of bentonite increases unduly the thermal conductivity. While a satisfactory product may be made with from 5% to 20% of the bentonite, we prefer a range from about 8% to about 16%.

As a secondary binder, we use an organic binder material which may either be a material which is resistant to boiling water in which case it may be used as such, or it may be a material which is not resistant to boiling water, in which case we add a small percentage of silicone to render the molded composition water resistant.

Two organic binder materials which are resistant to boiling water are polyvinyl acetate and emulsified asphalt. We have found that an emulsified asphalt which has been prepared by the use of bentonite clay as the principal emulsifying agent is particularly suitable for our purpose. These materials when incorporated in our molded perlite composition render the product resistant to boiling water and may be used as the secondary binder without the addition of silicone. The secondary binder, if it is one of the two above mentioned water-resistant binders, may be used in a quantity between 1% and 20% by weight of dry solids in the final product. Preferably, however, the percentage will be between 5% and 10%. If less than 2% of the secondary binder is used, the final material will be too weak. All the necessary strength is obtained with 20% of the secondary binder so that the use of a greater percentage thereof adds unnecessarily to the cost and adversely affects the thermal conductivity characteristics of the final product.

Among secondary binders which are not resistant to boiling water but which, according to our invention, may be used if a small amount of silicone is added are polyvinyl alcohol, acrylic polymers, starch, and carboxy methyl cellulose. In order to make it possible to use these materials, a small amount, between 0.2% and 1.0% by weight of dry solids in the final product of silicone, is added. The silicone waterproofs the organic binder which alone is not resistant to boiling and thereby makes the finished product water repellent and resistant to boiling water.

If we use a type of secondary binder with silicone, the binder may be used in an amount between 1% and 10% by weight of dry solids in the final product but preferably the amount will be between 1.5% and 6%. In the finished block of insulation material, the same ultimate results are achieved except in a slightly different way. Where we use the organic binder with silicone, the water does not penetrate the finished block and therefore the block does not disintegrate. Where we use the emulsified asphalt or polyvinyl acetate binder without silicone, water does penetrate the block, but because of the resistance to boiling water of the binder, the block will not disintegrate. For some purposes, it will be preferable to use a secondary binder which is not by itself resistant to boiling water, combined with silicone, because the block will not be wetted and better strengths will be achieved. We can, of course, add silicone to the block containing polyvinyl acetate or emulsified asphalt as the binder if it is desired to impart water-repellency to the product, even though the block is adequately resistant to disintegration by water without such addition.

Use of reinforcing fiber in our insulation product is optional. The fiber is for the purpose of purely mechanical reinforcement of the final product. Where the product is to be subjected to breaking stresses, it is desirable to use a fiber because the fibers will tend to mechanically hold chipped or cracked pieces of the product together. For this purpose any animal, vegetable or mineral fiber having adequate length and strength will serve. Of course, if high heat resistance is required and the product is to be capable of use at all temperatures, it will be necessary to use asbestos or other heat-resistant mineral fiber. We prefer to use from 5% to 10% fiber by weight of dry solids in the final product although for particular purposes a fiber content between 0 and 15% is satisfactory.

Thus, where polyvinyl acetate or emulsified asphalt constitutes the secondary binder, our composition of matter will contain from about 5% to about 20% bentonite, from about 1% to about 20% of the polyvinyl acetate or emulsified asphalt, from about 0 up to about 15% of fiber, and from about 45% to about 94% of expanded cellular perlite. We prefer, however, to maintain the proportions within the following ranges:

| | Percent |
|---|---|
| Bentonite | 8 to 16 |
| Polyvinyl acetate or emulsified asphalt | 5 to 10 |
| Fiber | 5 to 10 |
| Expanded perlite | 64 to 82 |

A still better compositional range is as follows:

| | Percent |
|---|---|
| Bentonite | About 12 |
| Polyvinyl acetate or emulsified asphalt | 5 to 10 |
| Fiber | About 5 |
| Perlite | 73 to 78 |

Where an organic binder, which is not resistant to boiling water, is to be used along with silicone, our permissible percentage ranges are:

| | Percent |
|---|---|
| Bentonite | 5 to 20 |
| Secondary binder | 1 to 10 |
| Silicone | .2 to 1.0 |
| Fiber | 0 to 15 |
| Expanded perlite | 54 to 94 |

Preferably, however, the percentages should be within the following ranges:

| | Percent |
|---|---|
| Bentonite | 8 to 16 |
| Secondary binder | 1.5 to 6 |
| Silicone | .2 to 1.0 |
| Fiber | 5 to 10 |
| Expanded perlite | 67 to 85 |

A still better compositional range is the following:

| | Percent |
|---|---|
| Bentonite | About 12 |
| Secondary binder | 1.5 to 6 |
| Silicone | .2 to 1.0 |
| Fiber | 0 to 5 |
| Perlite | 76 to 86 |

In preparing an insulating product, we use sufficient water to provide for proper solubility or dispersion of the binder solids and sufficient to properly disperse the binder solids upon the surfaces of the perlite particles and fiber throughout the mixture before molding it. In order to provide the greatest economy of manufacture, we prefer to keep the water to a minimum. Generally speaking, we find that an appropriate quantity of water is from 1.5 to 2.5 times the total weight of dry solids in the mixture.

In preparing a mixture for molding, the bentonite is first dispersed in water. This may be done by mixing the bentonite into the water with a propeller type high agitation mixer with weedless type blades, such as the well known commercial "Lightnin' Mixer." When the bentonite has been well dispersed in the water, the secondary binder is added and the mixing is continued until the secondary binder is either well dispersed or dissolved. If fiber is to be used, it is then added and mixed into the slurry. The mixed slurry is then added to the expanded perlite and gently mixed so as to assure that the individual perlite particles will be coated with the binder slurry without fracture of the perlite particles. The completely mixed material may best be described as a moist granular mix.

The molding operation is accomplished by placing a quantity of the mix in the mold, the mold being over filled, and the mix is then compressed in the mold at a pressure from about 20 pounds per square inch to about 60 pounds per square inch. Preferably the pressure will be about 40 pounds per square inch. In the molding process no water is expelled from the mixture. As soon as the mix has been compressed in the mold, it may be removed from the mold and dried. The molded piece may be dried at a temperature of 225° to 400° F., depending upon the formula used, and the drying will be continued until the moisture content is not more than 5% by weight.

The finished molded piece of insulation material shows no significant change from the mold dimensions so that machining thereof prior to use is not necessary. The molded article is mechanically stable, has good strength and high thermal insulation efficiency at all temperatures from −350° to 1700° F. and it is not structurally deteriorated by moisture or disintegrated by boiling water.

At the lower temperatures the organic secondary binder functions to give the necessary high strength to the product. At the more elevated temperatures the organic binders will gradually oxidize off but the bentonite or primary binder remains to impart structural integrity to the piece at the higher temperatures.

A particular montmorillonitic clay which we have found suitable is a commercial grade of bentonite mined at Upton, Wyoming. As examples of organic materials which are not resistant to boiling water and which may be used as secondary binders with silicone may be mentioned "Cyanamer 370" which is an acrylic polymer; "70 High Cellulose Gum," which is a carboxy methyl cellulose; "Elvanol Grade 71–30," a polyvinyl alcohol; "Elvalan," a vinyl polymer; "Cypan," an acrylic polymer, and "B–211 Mogul" starch.

Specific examples of the secondary binder which may be used without silicone are "Elvacet 81–900," a polyvinyl acetate, and "Ebontex," an emulsified asphalt (bentonite clay stabilized type). The silicone which we have used is identified as "Silicone XS–1."

As a specific example of a composition which we have found to be successful at all temperatures within the range and which is relatively low in cost is the following:

| | Percent |
|---|---|
| Expanded cellular perlite | 81.2 |
| Bentonite | 12.0 |
| Cyanamer 370 | 1.6 |
| Silicone | .2 |
| Asbestos fiber | 5.0 |

Water was used in an amount approximately 2.17 times the dry weight of the ingredients.

A product produced according to the above formula had a dry density of 12.6 pounds per cubic foot and a flexural strength by the test method of A.S.T.M. C203–55T of 97 pounds per square inch. The abrasion loss by the test method of U.S. Navy Specification 32 P8*b*, Section F-3*a*(7) was as follows:

| | Percent |
|---|---|
| 10 minutes | 30 |
| 20 minutes | 55 |

Typical conductivity figures of the product in B.t.u. per hour per square foot per degree F. per inch, were as follows:

| | |
|---|---|
| At mean temperature 100° F | 0.34 |
| At mean temperature 500° F | 0.56 |
| At mean temperature 1000° F | 0.80 |

It will be understood that a great variety of products may be made within the ranges disclosed herein and we therefore do not intend to limit ourselves except as set forth in the claims which follow.

Having now fully described our invention, what we claim as new and desire to secure by Letters Patent is:

1. A molded thermal insulating material comprising from about 45% to about 94% of expanded cellular perlite, from about 5% to about 20% of a montmorillonitic clay constituting a primary binder, from about 1% to about 20% of an organic binder material constituting a secondary binder, and selected from the group consisting of organic materials which are, per se, resistant to boiling water, and organic materials which are not, per se, resistant to boiling water, but which have been rendered resistant to boiling water by the addition of from about .2% to about 1.0% of silicone, and up to about 15% fiber, said material showing no significant change from mold dimensions, being mechanically stable, exhibiting good strength, and having high thermal insulation efficiency at all temperatures from −350° F. to 1700° F., and being highly resistant to structural disintegration by moisture or boiling water.

2. A molded thermal insulating material comprising from about 45% to about 94% expanded cellular perlite, from about 5% to about 20% of bentonite, from about 2% to about 20% of an organic binder material which is resistant to boiling water, and up to about 15% fiber, said material showing no significant change from mold dimensions, being mechanically stable, exhibiting good strength, and having high thermal insulation efficiency at all temperatures from −350° F. to 1700° F., and being highly resistant to structural disintegration by moisture or boiling water.

3. A molded thermal insulating material comprising from about 45% to about 94% expanded cellular perlite, from about 5% to about 20% of bentonite, from about 2% to about 20% of polyvinyl acetate, and up to about 15% fiber, said material showing no significant change from mold dimensions, being mechanically stable, exhibiting good strength, and having high thermal insulation efficiency at all temperatures from −350° F. to 1700° F., and being highly resistant to structural disintegration by moisture or boiling water.

4. A molded thermal insulating material comprising from about 45% to about 94% expanded cellular perlite, from about 5% to about 20% of bentonite, from about 2% to about 20% of emulsified asphalt, and up to about 15% fiber, said material showing no significant change from mold dimensions, being mechanically stable, exhibiting good strength, and having high thermal insulation efficiency at all temperatures from −350° F. to 1700° F., and being highly resistant to structural disintegration by moisture or boiling water.

5. A molded thermal insulating material comprising from about 64% to about 82% of expanded cellular perlite, from about 8% to about 16% of bentonite, from about 5% to about 10% of polyvinyl acetate, and from about 5% to about 10% fiber, said material showing no significant change from mold dimensions, being mechanically stable, exhibiting good strength, and having high thermal insulation efficiency at all temperatures from −350° F. to 1700° F., and being highly resistant to structural disintegration by moisture or boiling water.

6. A molded thermal insulating material comprising from about 64% to about 82% of expanded cellular perlite, from about 8% to about 16% of bentonite, from about 5% to about 10% of emulsified asphalt, and from about 5% to about 10% fiber, said material showing no significant change from mold dimensions, being mechanically stable, exhibiting good strength, and having high thermal insulation efficiency at all temperatures from −350° F. to 1700° F., and being highly resistant to structural disintegration by moisture or boiling water.

7. A molded thermal insulating material comprising from about 73% to about 78% of expanded cellular perlite, about 12% of bentonite, from about 5% to about 10% of polyvinyl acetate, and about 5% fiber, said material showing no significant change from mold dimensions, being mechanically stable, exhibiting good strength, and having high thermal insulation efficiency at all temperatures from −350° F. to 1700° F., and being highly resistant to structural disintegration by moisture or boiling water.

8. A molded thermal insulating material comprising from about 73% to about 78% of expanded cellular perlite, about 12% of bentonite, from about 5% to about 10% of emulsified asphalt, and about 5% fiber, said material showing no significant change from mold dimensions, being mechanically stable, exhibiting good strength, and having high thermal insulation efficiency at all temperatures from —350° F. to 1700° F., and being highly resistant to structural disintegration by moisture or boiling water.

9. A molded thermal insulating material comprising from about 54% to about 94% of expanded cellular perlite, from about 5% to about 20% of a montmorillonitic clay constituting a primary binder, from about 1% to about 10% of an organic binder which is not resistant to boiling water and constituting a secondary binder, from about .2% to about 1.0% silicone and up to about 15% fiber, said material showing no significant change from mold dimensions, being mechanically stable, exhibiting good strength, and having high thermal insulation efficiency at all temperatures from —350° F. to 1700° F., and being highly resistant to structural disintegration by moisture or boiling water.

10. A material according to claim 9, wherein said organic binder is a polyvinyl alcohol.

11. A material according to claim 9, wherein said organic binder is an acrylic polymer.

12. A material according to claim 9, wherein said organic binder is a carboxy methyl cellulose.

13. A material according to claim 9, wherein said organic binder is a starch.

14. A molded thermal insulating material comprising from about 67% to about 85% of expanded cellular perlite, from about 8% to about 16% of a montmorillonitic clay constituting a primary binder, from about 1.5% to about 6% of an organic binder which is not resistant to boiling water and constituting a secondary binder, from about .2% to about 1.0% silicone, and from about 5% to about 10% fiber, said material showing no significant change from mold dimensions, being mechanically stable, exhibiting good strength, and having high thermal insulation efficiency at all temperatures from —350° F. to 1700° F., and being highly resistant to structural disintegration by moisture or boiling water.

15. A material according to claim 14, wherein said organic binder is a polyvinyl alcohol.

16. A material according to claim 14, wherein said organic binder is an acrylic polymer.

17. A material according to claim 14, wherein said organic binder is a carboxy methyl cellulose.

18. A material according to claim 14, wherein said organic binder is a starch.

19. A molded thermal insulating material comprising from about 76% to about 86% of expanded cellular perlite, about 12% of a montmorillonitic clay constituting a primary binder, from about 1.5% to about 6% of an organic binder which is not resistant to boiling water and constituting a secondary binder, from about .2% to about 1.0% silicone, and up to about 5% fiber, said material showing no significant change from mold dimensions, being mechanically stable, exhibiting good strength, and having high thermal insulation efficiency at all temperatures from —350° F. to 1700° F., and being highly resistant to structural disintegration by moisture or boiling water.

20. A material according to claim 19, wherein said organic binder is a polyvinyl alcohol.

21. A material according to claim 19, wherein said organic binder is an acrylic polymer.

22. A material according to claim 19, wherein said organic binder is a carboxy methyl cellulose.

23. A material according to claim 19, wherein said organic binder is a starch.

References Cited in the file of this patent

UNITED STATES PATENTS

| | | |
|---|---|---|
| 2,511,830 | Fischer | June 20, 1950 |
| 2,625,512 | Powell | Jan. 13, 1953 |
| 2,636,543 | Groskopf | Apr. 28, 1953 |
| 2,733,159 | Scoggin | Jan. 31, 1956 |
| 2,742,373 | Groskopf | Apr. 17, 1956 |
| 2,742,374 | Groskopf | Apr. 17, 1956 |

FOREIGN PATENTS

| | | |
|---|---|---|
| 594,555 | Great Britain | Nov. 13, 1947 |

OTHER REFERENCES

Perlite (The Wonder Material), 21 page pamphlet, 1949, pages 8, 9.